United States Patent [19]

Murphy

[11] 3,824,869
[45] July 23, 1974

[54] CHAIN DRIVE HAVING PIVOTED DRIVE TEETH
[75] Inventor: Prescott V. Murphy, Kearny, N.J.
[73] Assignee: Standard Tool & Manufacturing Co., Lyndhurst, N.J.
[22] Filed: Sept. 25, 1972
[21] Appl. No.: 291,977

[52] U.S. Cl. ............................................. 74/243 R
[51] Int. Cl. ............................................ F16h 55/30
[58] Field of Search ........................ 74/243 R, 219

[56] References Cited
UNITED STATES PATENTS

| 500,807 | 7/1893 | Hunt | 74/243 R |
|---|---|---|---|
| 2,931,486 | 4/1960 | Zebarth | 74/243 R |
| 3,190,149 | 6/1965 | Gorfin | 74/243 R |
| 3,205,022 | 9/1965 | Eckert-Greifendorff | 74/243 R |
| 3,344,677 | 10/1967 | Morse | 74/219 |

FOREIGN PATENTS OR APPLICATIONS

| 17,944 | 8/1896 | Great Britain | 74/243 R |
|---|---|---|---|
| 524,639 | 7/1953 | Canada | 74/243 R |

Primary Examiner—Charles J. Myhre
Assistant Examiner—R. H. Lazarus
Attorney, Agent, or Firm—Harness, Dickey & Pierce

[57] ABSTRACT

A sprocket wheel is employed to drive a chain having cylindrical rollers separated by overlapping links secured to the roller pivots. The radius of the wheel is small when compared to the radius of the chain or a straight section thereof where the teeth contacts the chain rollers to produce the driving thereof. Individual teeth are equally spaced when pivoted around the edge of a wheel having a central drive shaft. The teeth project between two chain rollers with the engaging tooth face having an arcuate form to mate with the advanced roller. The wheel is mounted adjacent to a fixed cam that has a section of uniform radius to maintain the teeth in driving relation and a section of less radius forming a drop-off portion where the teeth leave the chain which progressively extends outwardly to blend in with the section of uniform radius where the teeth are moved outwardly in position to again engage a roller on the chain.

8 Claims, 4 Drawing Figures

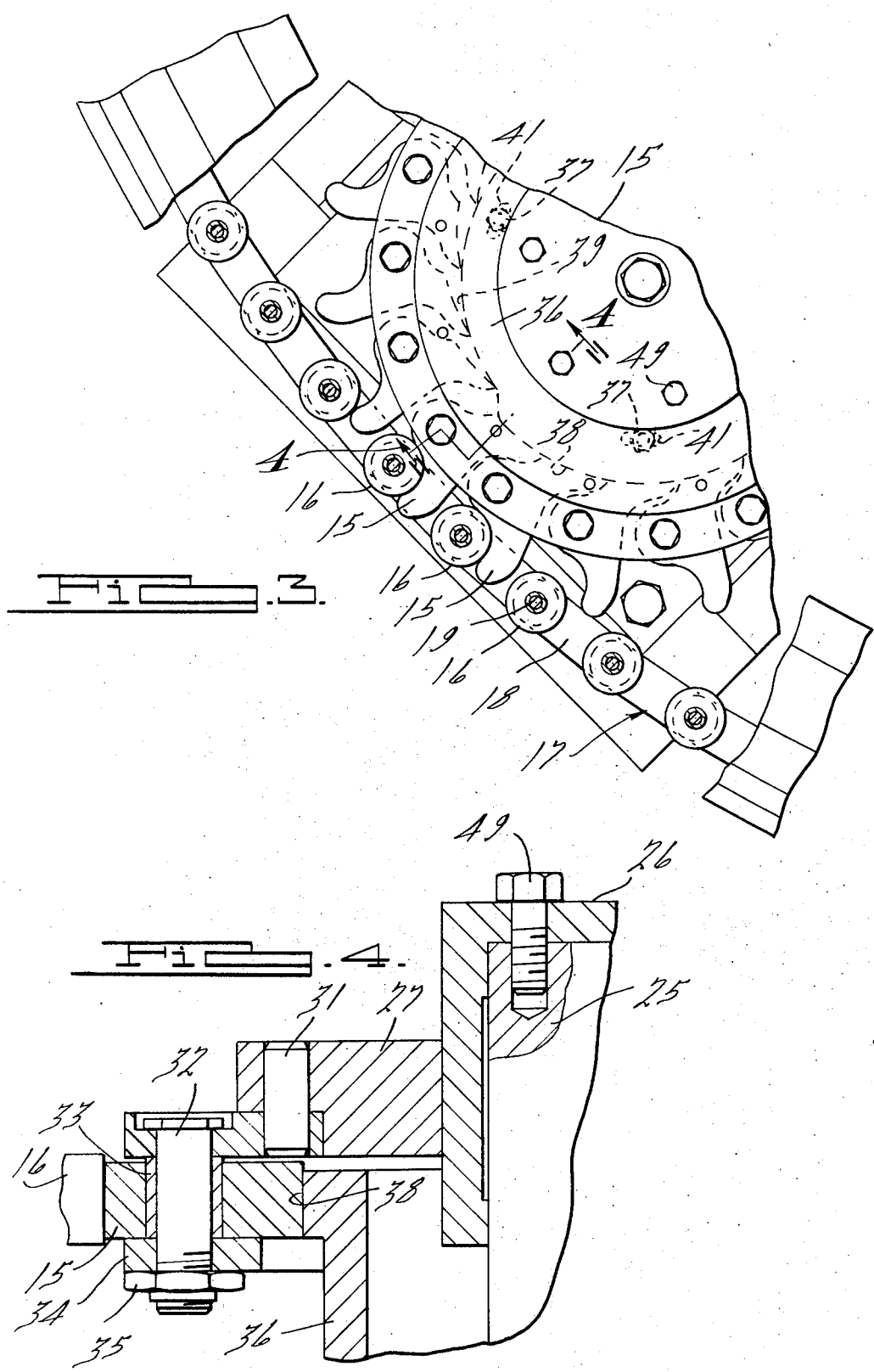

3,824,869

CHAIN DRIVE HAVING PIVOTED DRIVE TEETH

SUMMARY OF THE INVENTION

It is the practice to drive a chain by a sprocket having fixed teeth which are usually of the involute type to function in the same manner as an involute tooth on a set of gears. The sprocket wheel has a small radius and is mounted with the teeth in engagement with a straight or arcuate section of the chain at the point where the chain is driven. The chain has a tangent relationship with the sprocket wheel and only two or three teeth are in contact with the chain at the same time for producing its drive. The sprocket embodies a wheel portion having pivoted teeth on the periphery edge, each tooth having an inner cam engaging portion and an outer chain engaging portion. The teeth are substantially S-shape the outwardly extending portion projecting between a pair of chain rollers and are provided with a semicircular face which mates with the periphery of the roller when in driving relation therewith.

The inner portion of each tooth rides on a section of a circular cam ring which maintains the teeth outwardly in position to engage the chain rollers. The cam ring has a drop-off or dwell portion where each tooth rocks backwardly permitting the outer portion to move from between the chain rollers as the chain continues to be advanced. An overrunning clutch supports the sprocket wheel which is driven by a gear reduction unit and a motor to provide a continuous and positive drive with little or no wear occurring between the chain rollers and the engaged portion of the teeth as there is substantially no movement therebetween.

BRIEF DESCRIPTION OF THE DRAWINGS

FIG. 3 is an enlarged broken view of the sprocket and chain showing the driving relationship therebetween, and FIG. 4 is an enlarged sectional view of the structure illustrated in FIG. 3, taken on the line 4—4 thereof.

DESCRIPTION OF THE PREFERRED EMBODIMENTS

Figure 1:
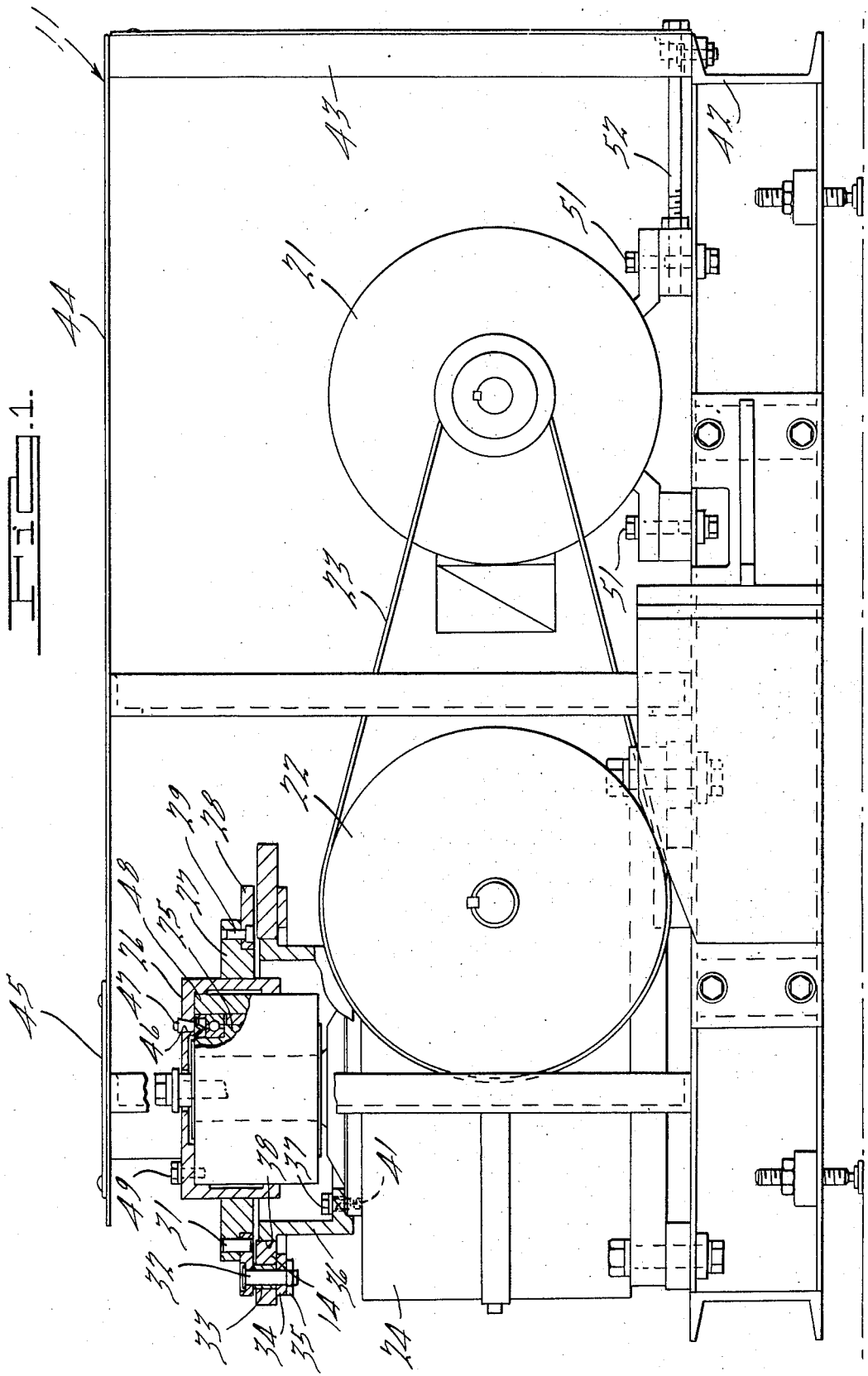
FIG. 1 is a plan view, with a part in section, of the chain drive which embodies features of the present invention.
Figure 2:
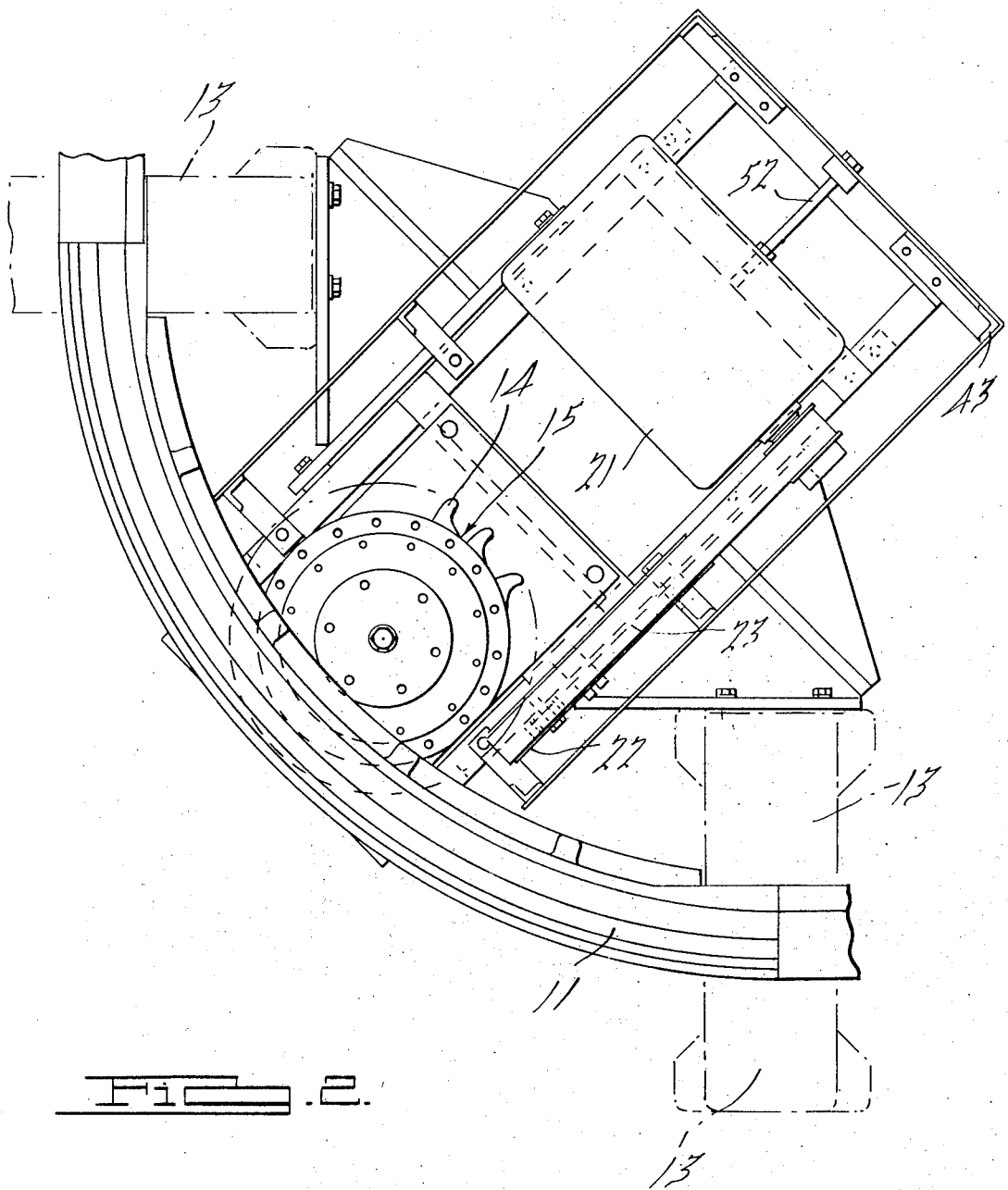
FIG. 2 is a broken plan view of the sprocket drive on the arcuate corner of the path of the driven chain which is substantially larger in radius than the sprocket wheel.

A chain drive unit 12 may be located on an arcuate corner portion of a continuous chain 11, as herein illustrated, or the drive may be on a straight portion thereof. The chain is supported to have any shape, circular, oval, square or rectangular with arcuate corners or the like. The chain forms a rectangular loop in the copending application of L. K. Shepard et al., Ser. No. 273,321, filed July 19, 1972, now U.S. Pat. No. 3,785,031, for "NONSYNCHRONOUS CONVEYOR SYSTEM," and assigned to the assignee of the present invention. The drive unit 12 for the chain 11 is mounted on supporting pillars 13 which are secured in position to have the teeth 14 of a sprocket wheel 15 engage rollers 16 of a chain section 17. The rollers 16 are interconnected by overlapping pairs of links 18 which are secured to the pivots 19 of the rollers. It will be noted that the chain section 17 has a large radius as compared to the radius of the sprocket wheel 15 so that the chain will be located on an arcuate or a straight section to be in tangential relation to the sprocket wheel.

As illustrated in FIG. 1, the drive unit 12 consists of a motor 21 which drives a pulley 22 by a belt 23 for driving a speed reducing unit 24 which drives the inner portion of an overrunning clutch 25 which drives an inverted cup shaped housing 26 to which the hub 27 for the sprocket wheel 15 is secured. The hub 27 has a ring 28 secured thereto by a plurality of screws 29 after being accurately related by a pair of dowel pins 31. The ring has a plurality of bolts 32 spaced equal distance apart for supporting the teeth 14 on bearing sleeves 33 which are clamped between the ring 28 and a washer 34 by nuts 35 tightened on the bolts 32. The teeth 14 are freely rotatable upon the bearing sleeves 33 as the chain is driven. The speed reducing unit 24 supports a cylindrical housing 36 when secured thereto by screws 37, as illustrated in FIG. 1. The housing has a cam surface 38 aligned with the teeth 14 for retaining them in drive position when the teeth are in engagement with the rollers of the chain.

At the point where the teeth leave the chain, the cam surface 38 drops off to form a dwell 39 which permits the teeth to rotate counterclockwise out of engagement with the roller of the chain with which it was engaged while producing a drive therefor. The surface 29 progressively increases in radius for approximately 180° and then becomes the surface 38 which backs up the teeth and maintains them in drive position until they reach the dwell 39 of the cam surface. The screws 37 extend through slots 41 in the flange of the housing 36 which permits the housing to be adjusted angularly to accurately locate the dwell 39 of the cam surface 38 so as to release the tooth from the chain at the proper time. A suitable base 42 and frame 43 is provided for supporting the motor and drive to form a unit therewith. The sheet of metal 44 encloses the top of the frame having a removable plate 45 by which oil may be introduced into the housing 26 of the overrunning clutch 25 through an opening 46 closed by a plug 47.

It will be noted that the outer portion 48 of the overrunning clutch 25 is secured to the housing 26 by a plurality of screws 49. The belt 23 may be tightened by releasing the supporting bolts 51 of the motor and adjusting its position by a pair of bolts 52 and thereafter tightening the bolts 51. It will be noted from FIG. 3 that only two of the teeth 15 are in engagement with a roller 16 of the chain for producing the driving thereof. In the figure, the more advanced tooth has reached the dwell 39 permitting the counterclockwise movement of the tooth 14 so that it will move out of engagement with the roller as the chain continues to advance as it is being driven by the next adjacent pair of teeth. It will be noted that four of the rollers are substantially on a straight line so that the same engagement occurs between the teeth and rollers when a straight section of track is being driven. The base 42 and frame 43 of the drive is attached to the pair of pillars 13 which support the track on which the chain is advanced. The overrunning clutch 25 permits the chain to be moved along the track in the direction in which it is driven without any restriction from the speed reducing unit 24.

I claim:

1. In a sprocket drive, a chain having spaced rollers and overlapping links on pivot pins, a sprocket wheel body, equally spaced sprocket teeth pivoted on the wheel body, a fixed cam ring having a cam edge aligned with the sprocket teeth a section of uniform radius which retains the teeth in driving relation on said wheel, said cam edge having a drop-off or dwell portion of less than said uniform radius at the point where the sprocket teeth leave the chain which permits each tooth to pivot backwardly thus permitting the driving face of each tooth to move from between the chain rollers as the chain continues to be advanced.

2. In a sprocket drive as recited in claim 1, wherein the sprocket teeth of the sprocket wheel engage the chain at substantially a straight section thereof.

3. In a sprocket drive as recited in claim 1, wherein the sprocket teeth have an arcuate recess on the driving face which mates with the engaged portion of the rollers.

4. In a sprocket drive as recited in claim 1, wherein the drop-off or dwell portion of the cam ring progressively increases in radius until it becomes the cam surface which retains the teeth in driving position.

5. In a sprocket drive as recited in claim 4, wherein said ring cam may be shifted angularly to accurately position said drop-off or dwell portion.

6. In a sprocket drive as recited in claim 1, wherein said sprocket wheel is driven through an overrunning clutch permitting the sprocket wheel to be rotated when the chain is pulled.

7. In a sprocket drive, a chain, a motor, a speed reduction unit driven by said motor, a hub having an annular flange driven by said reduction unit, sprocket teeth pivoted on said flange, and a cam ring having a cam edge of uniform radius opposite to the point where the chain is driven for holding the sprocket teeth in chain-driving position and a drop-off portion of less than said uniform radius opposite to the point where the sprocket tooth leaves the chain to release the drive face of the tooth therefrom, said drop-off portion progressively increasing in diameter to mate with the uniform radius of said cam edge.

8. In a sprocket drive as recited in claim 7, wherein a clutch is mounted in said hub which is of the overrunning type permitting the chain to be pulled as the sprocket wheel freely rotates.

* * * * *